(12) United States Patent
Takahashi

(10) Patent No.: US 10,971,106 B2
(45) Date of Patent: Apr. 6, 2021

(54) LIQUID CRYSTAL OPTICAL MODULATION DEVICE AND LIQUID CRYSTAL OPTICAL MODULATION METHOD

(71) Applicant: TOPPAN PRINTING CO., LTD., Tokyo (JP)

(72) Inventor: Hiroshi Takahashi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/599,760

(22) Filed: Oct. 11, 2019

(65) Prior Publication Data

US 2020/0043438 A1    Feb. 6, 2020

Related U.S. Application Data

(63) Continuation of application No. PCT/JP2018/015430, filed on Apr. 12, 2018.

(30) Foreign Application Priority Data

Apr. 13, 2017    (JP) .............................. JP2017-079741

(51) Int. Cl.
    *G09G 3/36*    (2006.01)
(52) U.S. Cl.
    CPC ..... *G09G 3/3696* (2013.01); *G09G 2330/021* (2013.01)
(58) Field of Classification Search
    CPC ....................... G09G 3/3696; G09G 2330/021
    See application file for complete search history.

(56) References Cited

U.S. PATENT DOCUMENTS

| | | | |
|---|---|---|---|
| 9,756,694 B2 * | 9/2017 | Serra | H05B 45/20 |
| 2013/0188105 A1 | 7/2013 | Dobrenko et al. | |

FOREIGN PATENT DOCUMENTS

| | | |
|---|---|---|
| EP | 3 579 045 A1 | 12/2019 |
| JP | 6449924 | 3/1989 |
| JP | 2013-72895 | 4/2013 |
| JP | 2013072895 | * 4/2013 |

OTHER PUBLICATIONS

International Search Report dated Jun. 19, 2018, in corresponding International Paatent Application No. PCT/JP2018/015430.
Written Opinion of the International Searching Authority dated Jun. 19, 2018 in corresponding International Patent Application No. PCT/JP2018/015430.
English Translation by WIPO of the International Preliminary Report on Patentability dated Oct. 24, 2019 in corresponding International Patent Application No. PCT/JP2018/015430.
Extended European Search Report dated Jul. 20, 2020 in corresponding European Patent Application No. 18783764.6.

* cited by examiner

*Primary Examiner* — Lisa S Landis

(57) ABSTRACT

There is provided a liquid crystal optical modulation device which performs light control drive for a liquid crystal panel, the device including a voltage limiting section that limits a power supply voltage, which is applied to the liquid crystal panel from a commercial AC source, and a control section that controls a voltage applied to the liquid crystal panel through the voltage limiting section in accordance with a phase of the power supply voltage of the commercial AC source.

19 Claims, 9 Drawing Sheets

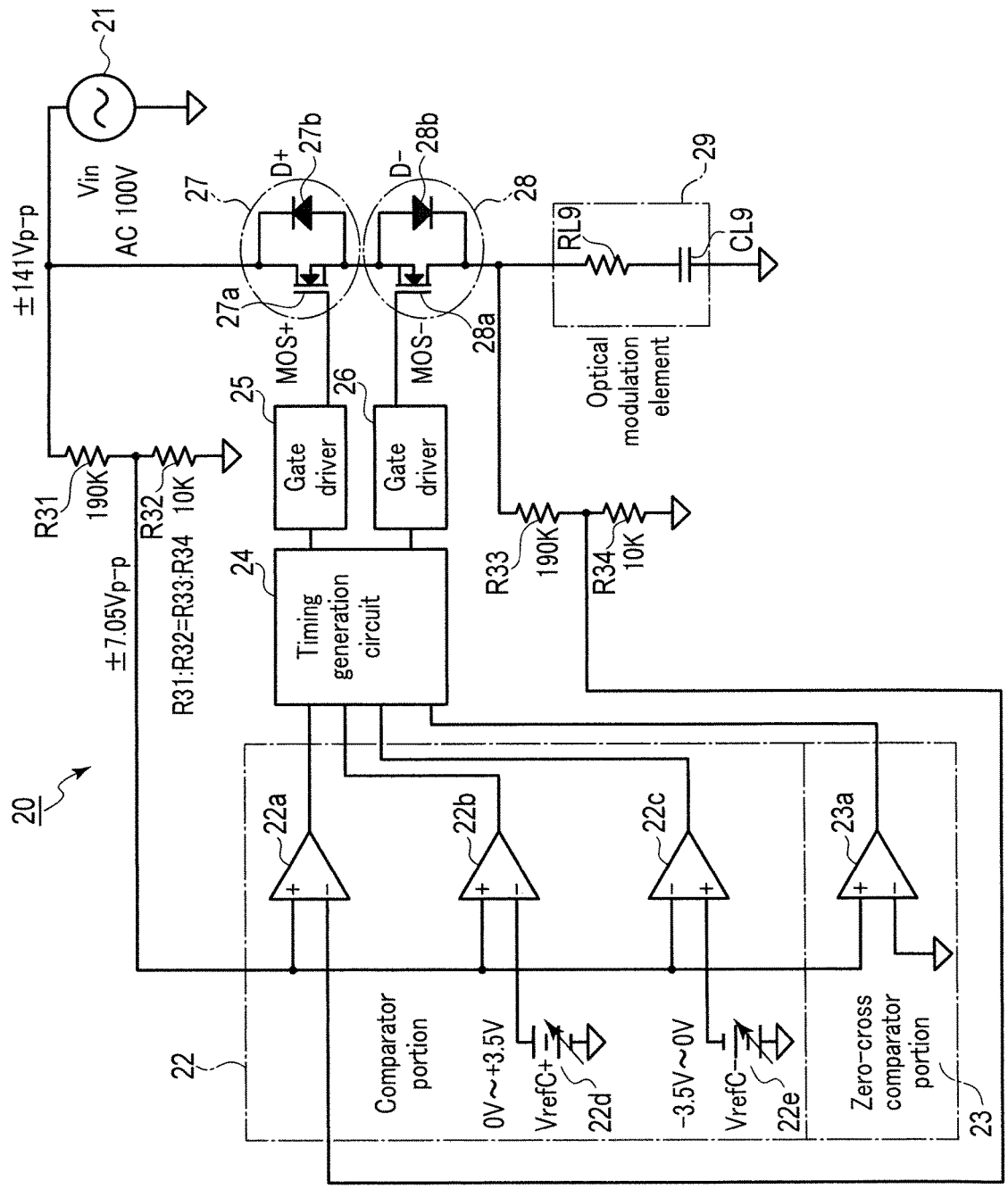
F I G. 1

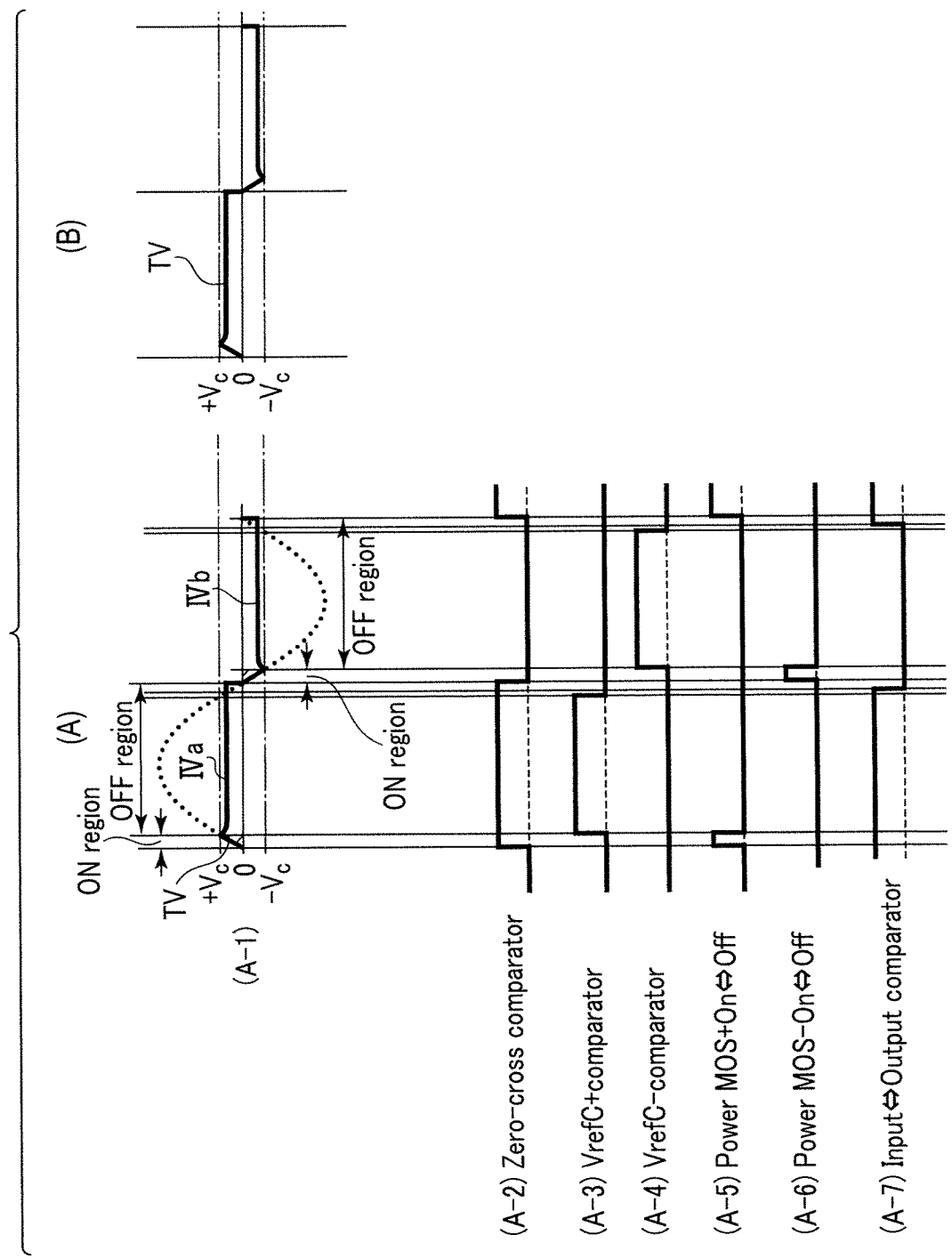
F I G. 4

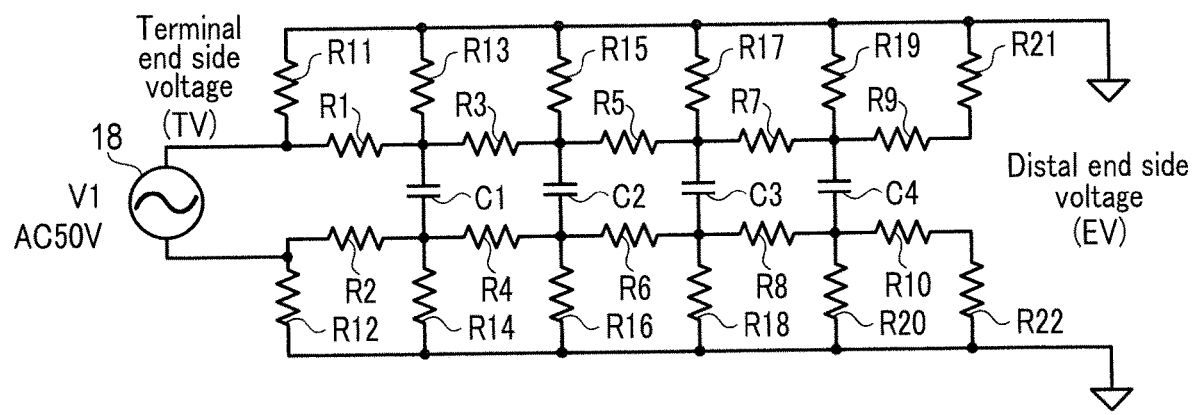
F I G. 11
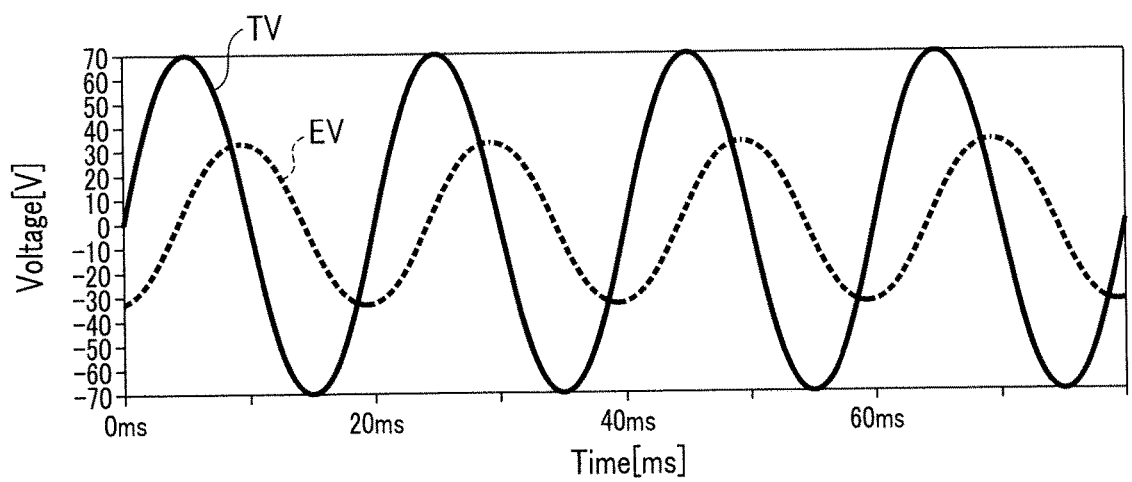
F I G. 12

LIQUID CRYSTAL OPTICAL MODULATION DEVICE AND LIQUID CRYSTAL OPTICAL MODULATION METHOD

CROSS-REFERENCE TO RELATED APPLICATIONS

This application is a Continuation Application of PCT Application No. PCT/JP2018/015430, filed Apr. 12, 2018 and based upon and claiming the benefit of priority from Japanese Patent Application No. 2017-079741, filed Apr. 13, 2017, the entire contents of all of which are incorporated herein by reference.

FIELD

The present invention relates generally to a liquid crystal optical modulation device and a liquid crystal optical modulation method suitable for light control glass using a polymer dispersed-type liquid crystal in particular.

BACKGROUND

In a known technology that has been proposed (e.g., Patent Literature 1), the ratio of a non-operating state to an operating state of polymer dispersed-type liquid crystal is reduced compared to a case in which an AC voltage from a commercial power source is applied directly to a transparent electrode, so that high transparency can be achieved.

PATENT LITERATURE

Patent Literature 1: Jpn. Pat. Appln. KOKAI Publication No. 2013-072895

FIGS. 8A and 8B illustrate a general configuration in which a polymer dispersed-type liquid crystal panel is applied to a light control glass 10 having a simple blind function. FIG. 8A shows the power off state. The polymer dispersed liquid crystal 17 is sealed and filled in an inside defined by transparent electrodes 13 and 14 on inner surface sides of two parallel plate glasses 11 and 12 as substrates, and spacers 15 and 16. A commercial power source 18 and a switch 19 are connected to the transparent electrodes 13 and 14.

Here, because the switch 19 is off, no voltage from the commercial power source 18 is applied to the polymer dispersed liquid crystal 17 between the transparent electrodes 13 and 14. In the polymer dispersed liquid crystal 17, as shown in the figure, a large number of liquid crystal molecules along mesh-like polymer fibers inside are irregularly arranged, so that light cannot be transmitted through the two glass plates 11 and 12 and is scattered. Since the light control glass 10 of this state scatters light as in the case of frosted glass and cannot transmit most of the light, the whole glass becomes white when seen from the indoor side. Therefore, for example, even if a tree is present outside the light control glass 10, a silhouette of the tree will appear only vaguely.

FIG. 8B shows a state in which the switch 19 is turned on. A voltage is applied to the polymer dispersed liquid crystal 17 between the transparent electrodes 13 and 14 to form an electric field, and liquid crystal molecules in the polymer dispersed liquid crystal 17 are aligned with their major axes in the direction orthogonal to the glass surface. Accordingly, the two glass plates 11 and 12 transmit the light and become transparent. The whole of the light control glass 10 in this state looks transparent when seen from the indoor side, and a tree present outside the light control glass 10 is clearly visible.

FIGS. 8A and 8B show how the light control glass 10 looks in the off state and the on state; however, in this type of light control glass 10, it is possible to perform halftone driving, thereby performing light control driving for steplessly adjusting a semi-transparent condition between the scattering and the transmission.

FIG. 9 exemplifies a voltage waveform of AC 100 [V] which is a general commercial power source used in homes and companies. This figure shows the same voltage waveform of frequency 60 [Hz] at an effective voltage 100 [V]; when the effective voltage is 100 [V], the peak value is approximately 141 m. The peak value greatly exceeds the general withstand voltage of the liquid crystal element used as the light control glass 10, and the power supply voltage cannot be directly applied as the drive voltage.

Therefore, there is a method of changing the voltage using a variable auto transformer known as a slidac (registered trademark) or a method of dividing an applied voltage using a resistor or a capacitor. However, each of the methods has problems; for example, the transformer is large and heavy, and the power consumption is large due to power loss in an internal element, such as a resistor and a capacitor.

Moreover, in the light control glass 10, it is necessary to provide a terminal portion connected to both of the transparent electrodes 13 and 14 at one end of the flat structure, generally near a corner portion, due to the installation structure in a house, etc. Therefore, a voltage drop occurs because of resistance and capacitance of the light control glass as an optical modulation element. FIG. 10 shows a state in which the light control glass 10 is connected to the commercial power source 18 at the left end side as a terminal side, while the right end in FIG. 10 is a distal end side. Therefore, depending on the size of the light control glass 10, even if a voltage at the maximum value according to the withstand voltage standard is applied from the commercial power source 18 to the terminal side, the voltage cannot reach the threshold of the voltage for driving the liquid crystal constituting the light control glass 10 at the distal end portion opposite to the terminal portion. As a result, there is a possibility that the entire surface cannot be uniformly shifted to the transmission mode.

FIG. 11 is a simplified diagram showing a configuration of an equivalent circuit electrically representing the light control glass 10. As shown in the figure, resistors R1 to R22 and capacitors C1 to C4 are arranged and connected in a ladder shape, between the terminal side at the left end and the distal end side at the right end.

FIG. 12 shows respective waveforms of a terminal side voltage TV and a distal end side voltage EV when sine wave AC power supply having a peak voltage value of 70 [V] (effective voltage value of about 50 [V]) is applied to the light control glass 10. As illustrated, the distal end side voltage EV has a peak value lower than that of the terminal side voltage TV, so that the peak voltage value is about 35 [V] (the effective voltage value is about 25 [V]).

When the area of the light control glass 10 is increased, or when the resistance value and the capacity are increased due to the difference in material or structure, there is a possibility that the terminal side is driven to be transparent, while the terminal end side is not driven to be completely transparent due to the voltage drop. Thus, surface unevenness may occur in the light control glass 10. This point is not taken into consideration in the technology described in the above-mentioned patent literature.

The present invention has been made in view of the above situation. It is an object of the present invention to provide a liquid crystal optical modulation device and a liquid crystal optical modulation method that can realize uniform optical modulation control without causing surface unevenness and the like, while driving with lower power consumption.

SUMMARY

According to one aspect of the present invention, there is provided a liquid crystal optical modulation device which performs light control drive for a liquid crystal panel, the device comprising: a voltage limiting section that limits a power supply voltage, which is applied to the liquid crystal panel from a commercial AC source; and a control section that controls a voltage applied to the liquid crystal panel through the voltage limiting section in accordance with a phase of the power supply voltage of the commercial AC source.

According to the present invention, it is possible to realize uniform optical modulation control without causing surface unevenness and the like, while driving with lower power consumption.

BRIEF DESCRIPTION OF THE DRAWINGS

FIG. 1 is a diagram showing a circuit configuration of a liquid crystal optical modulation device according to an embodiment of the present invention.

FIG. 4 is a timing chart showing signal waveforms at the time of halftone drive in the first operation example according to the embodiment.

FIG. 11 is a simplified diagram showing a configuration of an equivalent circuit electrically representing the light control glass of FIGS. 8A and 8B.

FIG. 12 is a diagram illustrating waveforms of the terminal side voltage TV and the distal end side voltage EV of the light control glass of FIGS. 8A and 8B.

DETAILED DESCRIPTION

Figure 2:
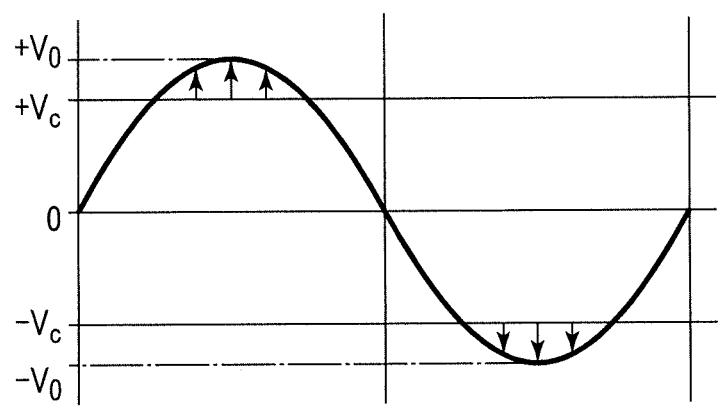
FIG. 2 is a diagram showing a voltage waveform when an AC voltage from a commercial power source is directly applied to an optical modulation device according to the embodiment.

Hereinafter, an embodiment of the present invention will be described in detail.

[Configuration]

FIG. 1 is a block diagram showing a circuit configuration of a liquid crystal optical modulation device 20 according to an embodiment of the present invention. In FIG. 1, a numeral 21 denotes a commercial power source of AC 100 [V], one end thereof is grounded, and the power supply voltage from the other end is applied to an optical modulation element 29 through switching circuits 27 and 28.

The switching circuits 27 and 28 corresponds to a voltage limiting section for limiting the power supply voltage from the commercial AC source 21 applied to the liquid crystal panel, which is the optical modulation element 29. Further, the liquid crystal optical modulation device 20 is provided with a control system (control section) including a comparator portion 22 which controls the voltage applied to an optical modulation element 29 by the switching circuits 27 and 28 according to the phase of the power supply voltage of the commercial AC source 21, a zero-cross comparator portion 23, a timing generation circuit 24, and gate drivers 25 and 26.

The optical modulation element 29 indicates a light control glass, which is a drive control target of the liquid crystal optical modulation device 20, and has an equivalent circuit configuration as shown in FIG. 11 above. In FIG. 11, the optical modulation element 29 is represented as a resistor RL9 and a capacitance CL 9 connected in series. The other end side of the capacitance CL9 that is not connected to the resistor RL9 is grounded.

The switching circuit 27 includes an N-channel MOSFET 27a and its parasitic diode (D+) 27b, and applies the AC power supply from the commercial power source 21 to a drain of the MOSFET 27a and a cathode of the parasitic diode 27b.

Similarly, the switching circuit 28 includes an N-channel MOSFET 28a and its parasitic diode (D−) 28b, and a source of the MOSFET 27a of the switching circuit 27 and an anode of the parasitic diode 27b are connected to a source of the MOSFET 28a and an anode of the parasitic diode 28b. A drain of the MOSFET 28a and a cathode of the parasitic diode 28b are connected to one end of the resistor RL9 of the optical modulation element 29.

When the switching circuits 27 and 28 are constituted by using bipolar transistors instead of the MOSFETs, equivalent functions can be realized by connecting external diodes for rectification in addition.

Further, a resistance voltage dividing portion is formed of resistors R31 and R32, and the AC power supply from the commercial power source 21 is applied to one end of the resistor R31. The other end of the resistor R32 that is not connected to the resistor R31 is grounded.

The resistors R31 and R32 divide the commercial power source voltage from the commercial power source 21 into ½₀ with resistance values of, for example, 190 [kΩ] and [kΩ]. When the commercial power source voltage from the commercial power source 21 has an effective value of 100 [V], that is, the peak value is ±141 [V], the potential at the connection middle point between the resistor R31 and the resistor R32 changes within a range of ±7.05 [V]. The potential at the connection middle point is supplied to each of plus (+) inputs of comparators 22a and 22b and a minus (−) input of a comparator 22c of the comparator portion 22, and a plus (+) input of a comparator 23a of the zero-cross comparator portion 23.

Further, a resistor R33 and a resistor R34 constituting a resistance voltage dividing portion having a voltage dividing ratio equal to that of the resistance voltage dividing portion constituted by the resistor R31 and the resistor R32 are provided, and the potential between the switching circuit 28 and the optical modulation element 29 is applied to one end of the resistor R33. The other end of the resistor R34 that is not connected to the resistor R33 is grounded.

The resistors R33 and R34 also divide the voltage supplied to the optical modulation element 29 into 1/20 with resistance values of, for example, 190 [kΩ] and 10 [kΩ], and the potential at the connection middle point is supplied to a minus (−) input of the comparator 22a that constitutes the comparator 22.

The DC voltage value from a variable DC power supply 22d is given to the minus (−) input to the comparator 22b of the comparator 22. Assuming that the withstand voltage limit of the optical modulation element 29 is, for example, ±70 V, the variable DC power supply 22d generates, as a reference voltage corresponding to the voltage +Vc, a discretionary voltage within a range of 0 [V] to +3.5 [V], which is 1/20 of a positive withstand voltage limit of +70 [V] as the maximum value, in accordance with the voltage division ratio of the resistors R31 and R32, and applies the generated reference voltage to the minus (−) input of the comparator 22b.

The DC voltage value from a variable DC power supply 22e is given to the plus (+) input to the comparator 22c of the comparator 22. Assuming that the withstand voltage limit of the optical modulation element 29 is, for example, ±70 V, the variable DC power supply 22e generates, as a reference voltage corresponding to the voltage −Vc, a discretionary voltage within a range of 0 m to −3.5 [V], which is 1/20 of a negative withstand voltage limit of −70 [V] as the minimum value, in accordance with the voltage division ratio of the resistors R31 and R32, and applies the generated reference voltage to the plus (+) input of the comparator 22c.

A voltage 0 [V] of a ground level is applied to the minus (−) input of the comparator 23a of the zero-cross comparator portion 23.

Then, the comparison outputs of the comparators 22a to 22c constituting the comparator 22 and the comparator 23a constituting the zero-cross comparator portion 23 are input to the timing generation circuit 24.

The timing generation circuit 24 determines a control timing with respect to the power supply voltage based on each output of the comparators 22a to 22c and 23a, and outputs control signals instructing on/off of the gate drivers 25 and 26 based on the determination result. The gate drivers 25 and 26 open and close the gates of the MOSFETs 27a and 28a of the switching circuits 27 and 28 based on the control signals from the timing generation circuit 24. The value of the voltage applied to the optical modulation element 29 is controlled by the switching operation of opening and closing the MOSFETs 27a and 28a in the switching circuits 27 and 28.

First Operation Example

A first operation example according to the above embodiment will be described.

FIG. 2 shows a voltage waveform when the AC voltage supplied from the commercial power source 21 is directly applied to the optical modulation element 29. When the effective value of the commercial power source 21 is 100 [V], its peak value is ±141 [V]; therefore, in FIG. 2, +V0 is +141 [V], and −V0 is −141 [V]. As described above, assuming that the withstand voltage limit of the optical modulation element 29 is, for example, ±70 [V], +Vc is +70 [V] and −Vc is −70 [V] in FIG. 2. Therefore, the voltage in the range indicated by arrows in FIG. 2, that is, at most +70 [V] or more and at least −70 [V] or lower should not be applied to the optical modulation element 29.

In the circuit configuration shown in FIG. 1 above, after the AC voltage from the commercial power source 21 is divided into 1/20 by the resistance voltage dividing portion, the voltage is judged by control. More specifically, the DC voltage in the range of 0 m to +3.5 [V] supplied from variable DC power supply 22d to the minus input of the comparator 22b of the comparator portion 22 is a reference voltage on the plus side corresponding to +Vc mentioned above.

Similarly, the DC voltage in the range of −3.5 [V] to 0 [V] supplied from variable DC power supply 22e to the plus input of the comparator 22c of the comparator portion 22 is a reference voltage on the minus side corresponding to −Vc mentioned above.

Here, the reference voltages applied to the comparators 22b and 22c are not +3.5 [V] and −3.5 [V] as fixed values, because the optical modulation element 29 is controlled by not only on/off drive control in two stages of diffusion and transparency of the full tone, but also can be made steplessly adjustable with the halftone between diffusion and transparency of the full tone.

Figure 3:
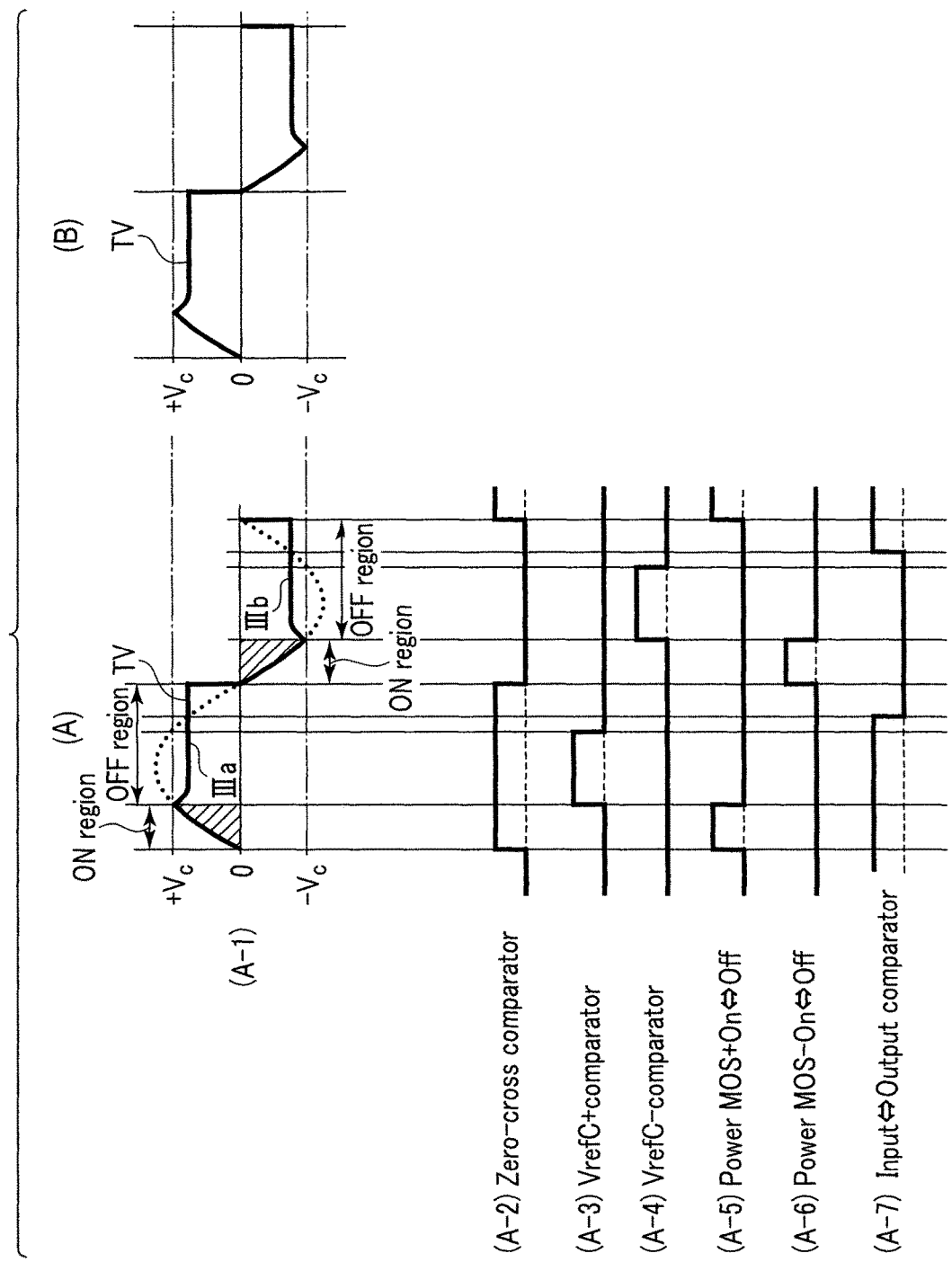
FIG. 3 is a timing chart showing signal waveforms at the time of fulltone drive in a first operation example according to the embodiment.

FIG. 3 is a timing chart showing signal waveforms particularly in the case of driving the optical modulation element 29 with the full tone executed by the liquid crystal optical modulation device 20.

In the waveform in (A-1) of (A) in FIG. 3, a portion indicated by a dotted line represents the waveform of the AC power supply from the commercial power source 21.

In the zero-cross comparator portion 23, the comparator 23a compares the divided value of 1/20 of the voltage of the AC power supply with the ground level 0 [V], so that, as shown in FIG. 3 (A-2), a comparison result that is "1" level in the positive part of the first half ½ cycle of the original AC voltage and "0" level in the negative part of the second half ½ cycle is output to the timing generation circuit 24.

In addition, in the ¼ cycle of the first half when the voltage from the commercial power source 21 rises above the zero crossing point, until the voltage from the commercial power source 21 changes from 0 [V] to +Vc [V], the output of the comparator 22b is at the "0" level, as shown in FIG. 3 (A-3).

During this time, based on the control signal from the timing generation circuit 24, the gate driver 25 turns on the MOSFET 27a of the switching circuit 27 to open it as shown in FIG. 3 (A-5). On the other hand, as shown in FIG. 3 (A-6), the gate driver 26 keeps off the MOSFET 28a of the switching circuit 28 in the closed state.

Therefore, until the voltage from the commercial power source 21 rises above the zero crossing point to reach +Vc [V], the voltage is applied to the optical modulation element 29 through the MOSFET 27a and the parasitic diode 28b, and the optical modulation element 29 is charged with the applied voltage, as shown by hatching in FIG. 3 (A-1).

Then, when the voltage from the commercial power source 21 reaches +Vc [V], the output of the comparator 22b becomes the "1" level as shown in FIG. 3 (A-3). In response to the output of the comparator 22b, the timing generation circuit 24 turns off the MOSFET 27a of the switching circuit 27 via the gate driver 25 to the closed state.

Therefore, as indicated by a period IIIa in FIG. 3 (A-1), the voltage application from the commercial power source 21 to the optical modulation element 29 is cut off, and immediately thereafter, the electric charge flows to the distal end side due to the difference in surface potential between the terminal side and the distal end side, and causes a slight voltage drop. However, since the optical modulation element 29 itself is a capacitive load, the electric charge stored in the optical modulation element 29 does not flow to the power supply side and the potential can be maintained.

Thus, when the voltage of the commercial power source 21 falls below the actual potential of the optical modulation element 29 while the supply of the voltage of the commercial power source 21 to the optical modulation element 29 is cut off, as shown in FIG. 3 (A-7), the output of the comparator 22a of the comparator portion 22 which is comparing the voltages is changed from the "1" level to the "0" level.

After that, when the voltage from the commercial power source 21 is further lowered and reaches 0 [V] at the beginning of the second half of the cycle, the output of the comparator 23a of the zero-cross comparator portion 23 changes from the "1" level to the "0" level.

Thereafter, in the first ¼ cycle of the second half when the voltage from the commercial power source 21 falls below the zero crossing point, until the voltage of the AC power supply changes from 0 [V] to −Vc [V], the output of the comparator 22c is maintained at the "0" level, as shown in FIG. 3 (A-4).

During this time, based on the control signal from the timing generation circuit 24, the gate driver 26 turns on the MOSFET 28a of the switching circuit 28 to open it as shown in FIG. 3 (A-6). On the other hand, as shown in FIG. 3 (A-5), the gate driver 25 keeps off the MOSFET 27a of the switching circuit 27 in the closed state.

Therefore, until the voltage from the commercial power source 21 falls below the zero crossing point to reach −Vc [V], the voltage is applied to the optical modulation element 29 through the MOSFET 28a and the parasitic diode 27b, and the optical modulation element 29 is charged with the applied voltage, as shown by hatching in FIG. 3 (A-1).

Then, when the voltage from the commercial power source 21 reaches −Vc [V], the output of the comparator 22c becomes the "1" level as shown in FIG. 3 (A-4). In response to the output of the comparator 22c, the timing generation circuit 24 turns off the MOSFET 28a of the switching circuit 28 via the gate driver 26 to the closed state.

Therefore, as indicated by a period IIIb in FIG. 3 (A-1), the voltage application from the commercial power source 21 to the optical modulation element 29 is cut off, and immediately thereafter, the voltage slightly drops. However, since the optical modulation element 29 itself is a capacitive load, the electric charge stored in the optical modulation element 29 does not flow to the power supply side and the potential is maintained.

The waveform of the terminal-side voltage TV applied to the optical modulation element 29, obtained by the operation of FIG. 3 (A-1), is shown in FIG. 3 (B).

By performing the on/off control of the switching circuits 27 and 28 as described above, it is possible to obtain the voltage waveform that maintains the potential while reliably avoiding the application of a voltage greater than the predetermined voltages +Vc and −Vc to the optical modulation element 29.

Further, by minimizing the on time in the switching circuits 27 and 28, the internal power loss by the MOSFETs 27a and 28a constituting the switching circuits 27 and 28 can be minimized.

In addition, by turning off the switching circuits 27 and 28 in the falling phase in which the sine wave drive voltage exceeds the peak and the absolute value of the voltage value decreases, even in the period when the voltage absolute value of the commercial power source 21 is below the voltage absolute value of the optical modulation element 29, the voltage of the optical modulation element 29 does not decrease along with the voltage value of the commercial power source 21, and the voltage applied to the optical modulation element 29 can be maintained until the next zero crossing point.

Regarding the operation shown in FIG. 3 above, in consideration of the withstand voltage limit of the optical modulation element 29, for example, the waveform with +Vc corresponding to +70 [V] and −Vc corresponding to −70 [V] has been described as an example. This is a driving state of the optical modulation element 29 with the full tone, namely the normal mode, in which the light transmittance of the light control glass is the highest, using the polymer dispersed-type liquid crystal. As described above, it is also possible to drive the optical modulation element 29 with a halftone between scattering and transmission by adjusting the reference voltage with the variable DC power supplies 22d and 22e of the comparator portion 22.

FIG. 4 is a timing chart showing signal waveforms in the case of performing such half-tone drive.

In the waveform in (A-1) of (A) in FIG. 4, a portion indicated by a dotted line represents the waveform of the AC power supplied from the commercial power source 21.

The specific operation itself is the same as in the case of FIG. 3 above; therefore, the detailed description is omitted. In the ¼ cycle of the first half when the voltage from the commercial power source 21 rises above the zero crossing point, only when the voltage from the commercial power source 21 changes from 0 [V] to +Vc [V], the MOSFET 27a of the switching circuit 27 is turned on to be an open state, so that the voltage from the commercial power source 21 is supplied to the optical modulation element 29 through the MOSFET 27a and the parasitic diode 28b. Thereafter, the MOSFET 27a is turned off to hold the potential as indicated by a period IVa in FIG. 4 (A-1).

Similarly, in the ¼ cycle of the second half when the voltage from the commercial power source 21 falls below the zero crossing point to be a negative voltage, only when the voltage from the commercial power source 21 changes from 0 [V] to −Vc [V], the MOSFET 28a of the switching circuit 28 is turned on to be an open state, so that the voltage from the commercial power source 21 is supplied to the optical modulation element 29 through the MOSFET 28a and the parasitic diode 27b. Thereafter, the MOSFET 28a is turned off to hold the potential as indicated by a period IVb in FIG. 4 (A-1).

The waveform of the terminal-side voltage TV applied to the optical modulation element 29, obtained by the operation of FIG. 4 (A-1), is shown in FIG. 4 (B).

Thus, it is also possible to drive the optical modulation element 29 with any halftone between scattering and transmission, not fulltone, by setting the reference voltage in the variable DC power supplies 22d and 22e of the comparator portion 22 smaller than the value corresponding to the withstand voltage limit of the optical modulation element 29.

Figure 5:
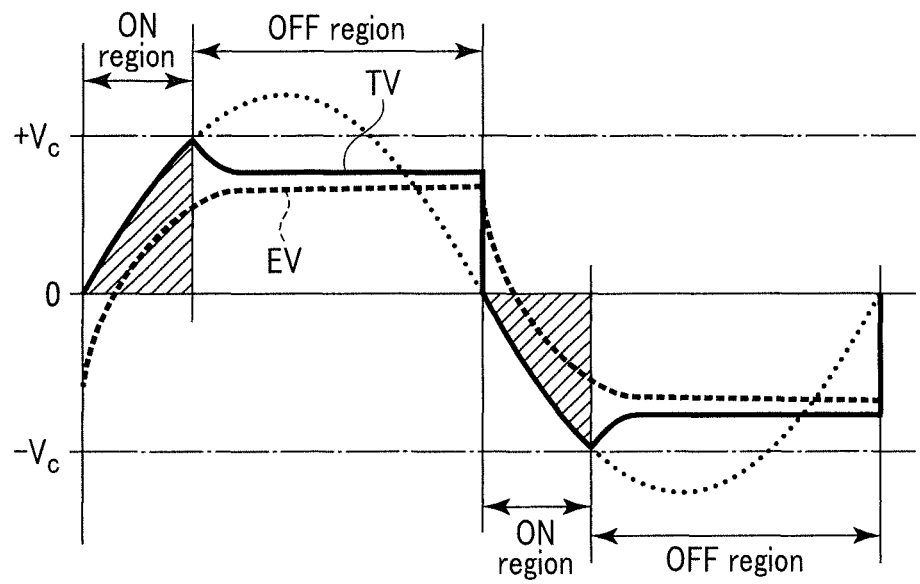
FIG. 5 is a diagram showing waveforms of a terminal side voltage and a distal end side voltage in the first operation example according to the embodiment.

FIG. 5 shows respective waveforms of the terminal side voltage TV and the distal end side voltage EV applied to the optical modulation element 29 by opposite phase control in the first operation example as a reference of this operation example. In the initial ¼ cycle when the voltage from the commercial power source 21 rises above the zero crossing point, as an on period by one of the switching elements when the voltage from the commercial power source 21 changes from 0 [V] to +Vc [V], the terminal side voltage TV indicated by the solid line in FIG. 5 is applied, so that the voltage value is increased while accumulating charges as shown by hatching in the drawing.

Thereafter, when the voltage of the commercial power source 21 reaches +Vc [V], the on period is ended, and both of the switching elements are turned off. Immediately after the switching elements are turned off, the terminal voltage TV slightly drops. Then, the potential gradually decreases as the electric charge moves to the terminal end side, and the potential is maintained since the optical modulation element 29 itself is a capacitive load.

On the other hand, the distal end side voltage EV indicated by the broken line in the figure is sequentially increased in a delayed phase as compared to the terminal side voltage TV. Even after the voltage of the commercial power source 21 reaches +Vc [V] and the off period starts, the potential rises gradually by the electric charge moving from the terminal side although the degree of rise decreases, as shown in the drawing.

In the above-mentioned off period, the difference between the terminal side voltage TV and the distal end side voltage EV becomes smaller as time passes. If the off period is set sufficiently long, there is no difference between the terminal side voltage TV and the distal end side voltage EV.

As described above, the potentials on the terminal side and the distal end side of the optical modulation element 29 converge in the same potential direction after stopping the voltage application. Therefore, as compared to the sine wave drive shown in FIG. 12, the potential difference between the terminal side voltage and the distal end side voltage can be reduced, and surface unevenness due to the difference in the amount of transmitted light can be reduced.

Second Operation Example

A second operation example according to the above embodiment will be described.

In the first operation example, as shown in FIG. 5, the polarity is reversed in the second half of the cycle of the voltage from the commercial power source 21, so that a similar operation is repeated with the reversed polarity, while there is a difference between the terminal side voltage TV and the distal end side voltage EV.

Figure 6:
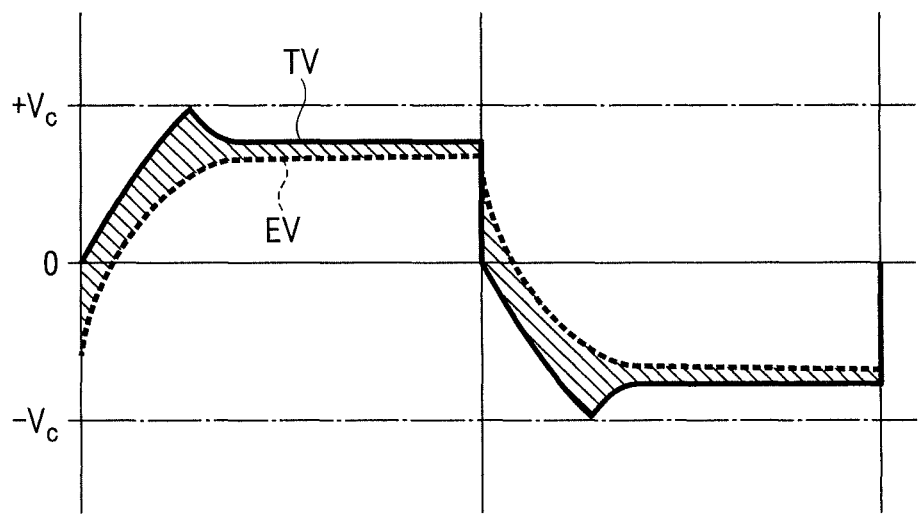
FIG. 6 is a diagram showing waveforms of a terminal side voltage and a distal end side voltage in the first operation example according to the embodiment.

FIG. 6 shows only the waveforms of the terminal side voltage TV and the distal end side voltage EV extracted from FIG. 5. The size of the area of the hatched portion corresponding to a difference between the terminal side voltage TV shown by the solid line in the drawing and the distal end side voltage EV shown by the broken line in FIG. 6 is considered appears as the difference in degree of the surface unevenness of the transparency on the terminal side and the distal end side in the optical modulation element 29.

Figure 7:
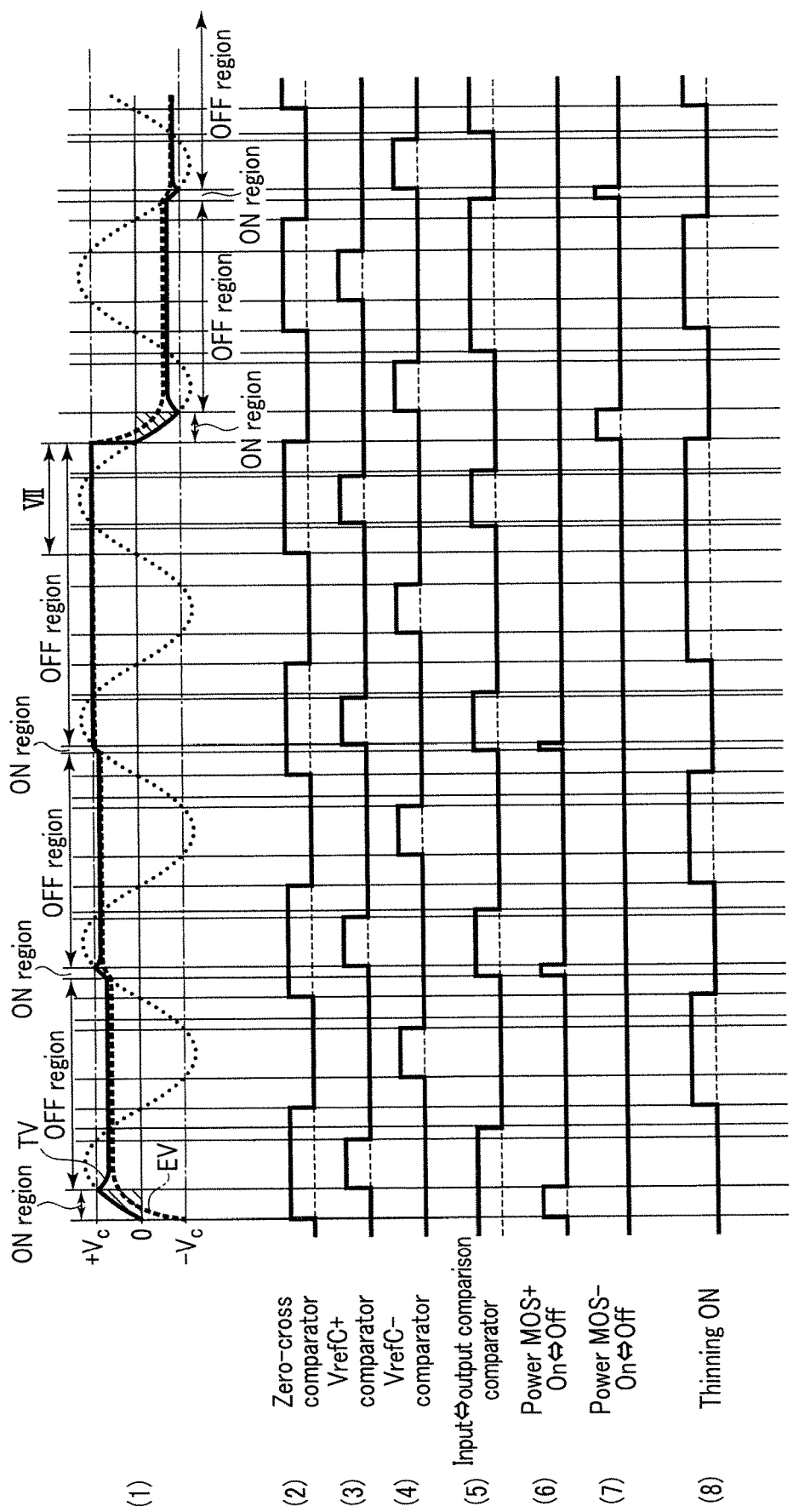
FIG. 7 is a timing chart showing signal waveforms at the time of driving in a second operation example according to the embodiment.
Figure 8A:
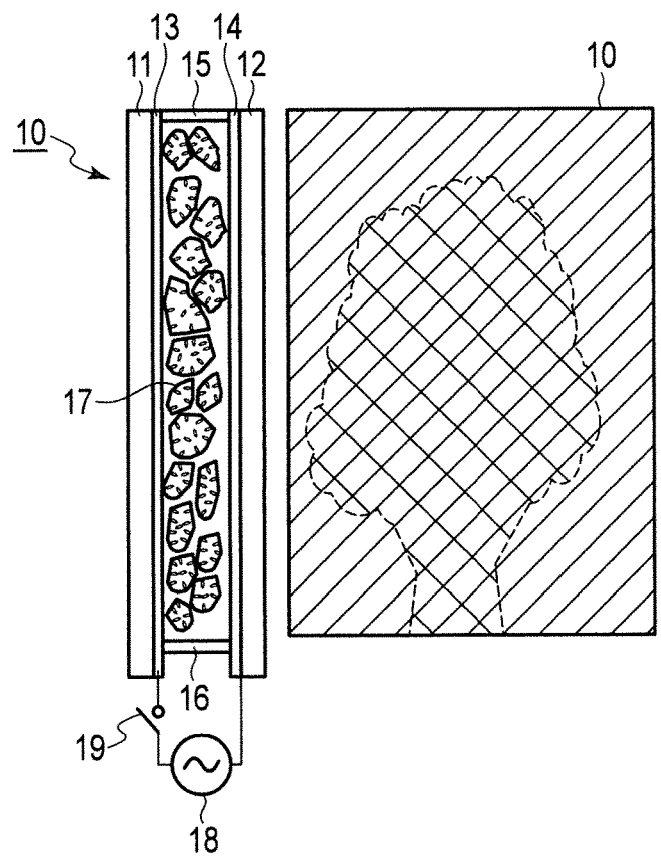
FIG. 8A is a view showing a structure of a light control glass using a general polymer dispersed liquid crystal and a light control state (power off state).
Figure 8B:
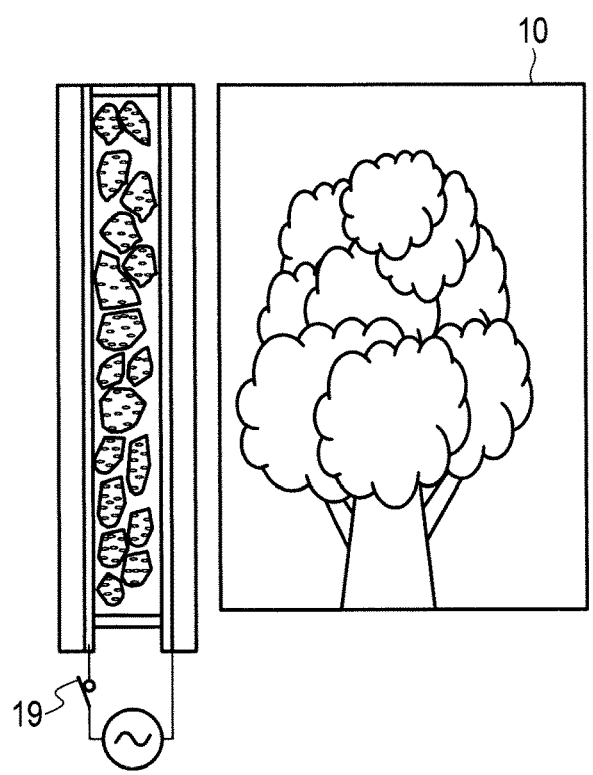
FIG. 8B is a view showing a structure of a light control glass using a general polymer dispersed liquid crystal and a light control state (power on state).
Figure 9:
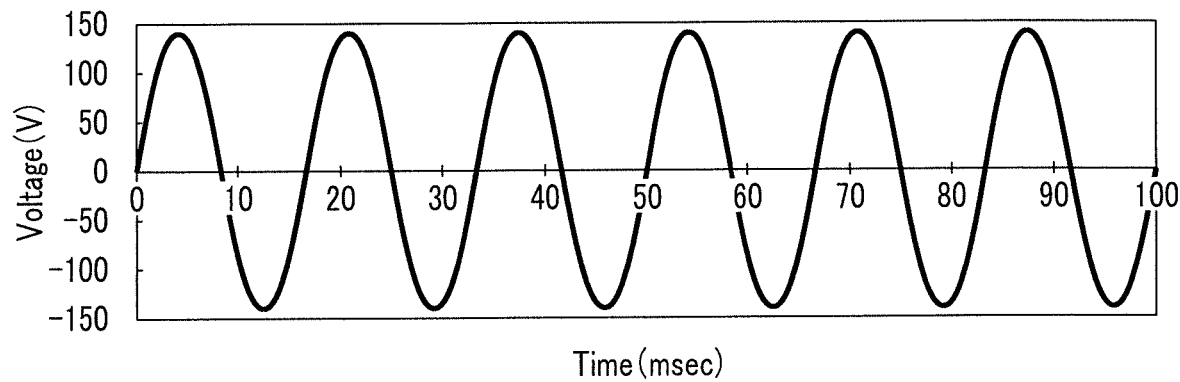
FIG. 9 is a diagram showing a sine-wave waveform of a commercial power source applied to the liquid crystal optical modulation device of FIGS. 8A and 8B.
Figure 10:
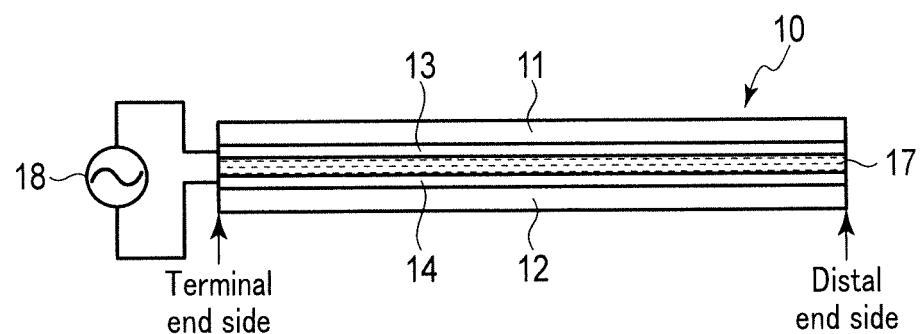
FIG. 10 is a view showing the positional relationship between the voltage terminal side and the distal end side in the light control glass of FIGS. 8A and 8B.

FIG. 7 is a timing chart showing signal waveforms when the liquid crystal optical modulation device 20 operates, in particular when the optical modulation element 29 is driven with fulltone drive in the second operation example of the present embodiment.

In this operation example, the timing generation circuit 24 is provided with a counter for counting the cycle of the voltage of the commercial power source 21 by the output of the comparator 23a of the zero-cross comparator portion 23. With reference to the count value and the level of the comparator 23a, a thinning operation shown in FIG. 7 (8) (to be described later) is executed.

In the waveform in FIG. 7 (1), a portion indicated by a dotted line represents the waveform of the AC power supplied from the commercial power source 21.

In the zero-cross comparator portion 23, the comparator 23a compares the divided value of ½₀ of the voltage of the AC power supply with the ground level 0 [V], so that, as shown in FIG. 7 (2), a comparison result that is "1" level in the positive part of the first half ½ cycle of the original AC voltage and "0" level in the negative part of the second half ½ cycle is output to the timing generation circuit 24.

In addition, in the ¼ cycle of the first half when the voltage from the commercial power source 21 rises above the zero crossing point, until the voltage from the commercial power source 21 changes from 0 [V] to +Vc [V], the output of the comparator 22b is at the "0" level, as shown in FIG. 7 (3).

During this time, based on the control signal from the timing generation circuit 24, the gate driver 25 turns on the MOSFET 27a of the switching circuit 27 to open it as shown in FIG. 7 (6). On the other hand, as shown in FIG. 7 (7), the gate driver 26 keeps off the MOSFET 28a of the switching circuit 28 in the closed state.

Therefore, until the voltage from the commercial power source 21 rises above the zero crossing point to reach +Vc [V], the voltage is applied to the optical modulation element 29 through the MOSFET 27a and the parasitic diode 28b, and the optical modulation element 29 is charged with the applied voltage, as shown by hatching in FIG. 7 (1).

Then, when the voltage from the commercial power source 21 reaches +Vc [V], the output of the comparator 22b becomes the "1" level as shown in FIG. 7 (3). In response to the output of the comparator 22b, the timing generation circuit 24 turns off the MOSFET 27a of the switching circuit 27 via the gate driver 25 to the closed state.

Therefore, the voltage application from the commercial power source 21 to the optical modulation element 29 is cut off. Immediately thereafter, the electric charge flows to the distal end side due to the difference in surface potential between the terminal side and the distal end side, and causes a slight voltage drop. However, since the optical modulation element 29 itself is a capacitive load, the electric charge stored in the optical modulation element 29 does not flow to the power supply side and the potential can be maintained.

Thus, when the voltage of the commercial power source 21 falls below the actual potential of the optical modulation element 29 while the supply of the voltage of the commercial power source 21 to the optical modulation element 29 is cut off, as shown in FIG. 7 (5), the output of the comparator 22a of the comparator portion 22 which is comparing the voltages is changed from the "1" level to the "0" level.

The operation itself in the first half of the first cycle is equivalent to the first operation example and the contents shown in FIG. 5.

After that, when the voltage from the commercial power source 21 is further lowered and reaches 0 [V] at the beginning of the second half of the cycle, the output of the comparator 23a of the zero-cross comparator portion 23 changes from the "1" level to the "0" level.

Upon receipt of the output of the comparator 23a, the timing generation circuit 24 refers to the value "0" of the internal counter and the level of the comparator 23a, and changes the thinning signal from "0" level to "1" level, as shown in FIG. 7 (8).

Thereafter, in the second half of the cycle when the voltage from the commercial power source 21 falls below the zero crossing point, the timing generation circuit 24 turns off both the switching circuits 27 and 28 because the thinning signal is at the "1" level. The potential state of the optical modulation element 29, which is a capacitive load, is maintained by executing a process of "thinning out" application of a negative voltage from the commercial power source 21.

In FIG. 7 (1), the terminal side voltage TV gradually lowers the potential while almost maintaining the potential in the first half of the cycle. On the other hand, the distal end side voltage EV gradually raises the potential, though it is lower in value than the terminal side voltage TV. Therefore, the difference between the terminal side voltage TV and the distal end side voltage EV becomes smaller as time passes.

Thereafter, when the voltage from the commercial power source 21 rises to 0 [V] at the beginning of the second half of the cycle, the output of the comparator 23a of the zero cross comparator portion 23 changes from the "0" level to the "1" level.

Upon receipt of the output of the comparator 23a, the timing generation circuit 24 increments the value of the internal counter by "+1", and with reference to the level of the comparator 23a, changes the thinning signal from the "1" level to the "0" level, as shown in FIG. 7 (8).

The timing generation circuit 24 delays the on operation in the switching circuit 27 by the output of the comparator 22a which compares the voltage of the commercial power source 21 with the potential of the optical modulation element 29, and holds the potential of the optical modulation element 29.

Then, at the same time as the output of the comparator 22a becomes the "1" level, the switching circuit 27 is turned on via the gate driver 25. Until the voltage from the commercial power source 21 reaches +Vc [V], a positive voltage is additionally applied to the optical modulation element 29.

In FIG. 7 (1), the terminal side voltage TV is increased again for a short time in the first half of the second cycle. The terminal side voltage TV slightly drops immediately after the application is stopped, but maintains a potential higher than that in the first cycle. The potential of the distal end side voltage EV is further increased when the on operation starts, and is then gradually raised. Accordingly, the difference with the distal end side voltage TV becomes smaller than that in the first period.

Also in the second half of the second cycle, as in the second half of the first cycle, the timing generation circuit 24 executes processing to thin out the application of the negative voltage to the optical modulation element 29 with reference to the count value of the counter in the timing generation circuit 24 and the level of the comparator 23a.

Therefore, in the second half of the second cycle, the terminal side voltage TV maintains a potential closer to +Vc [V] than that in the first cycle, while the distal end side voltage EV also maintains a potential closer to the value of the terminal side voltage TV.

Also in the third cycle, as in the second cycle, the application of voltage is performed only for a short period of time until the supply voltage from the optical modulation element 29 becomes +Vc [V] after it becomes equal to the potential of the optical modulation element 29 in the first half of the cycle.

The terminal side voltage TV is further increased in this short on-operation period, and slightly decreases immediately after the application is stopped, but maintains a potential closer to +Vc [V] than in the second cycle. Also, the distal end side voltage EV further increases the potential during the on-operation period and gradually increases the potential thereafter. As a result, the difference with the terminal side voltage TV is much smaller than in the second cycle.

In the second half of the third cycle, as in the second half of each of the first and second cycles, a process of thinning out the application of the negative voltage to the modulation device 29 is executed with reference to the count value of the counter in the timing generation circuit 24 and the level of the comparator 23a.

Therefore, in the second half of the third period, the distal end side voltage EV is approximately equal to the terminal side voltage TV, while the terminal voltage TV maintains a potential closer to +Vc [V] than in the second cycle.

In the first half of the fourth cycle thereafter, the timing generation circuit 24 refers to the count value "3" of the internal counter and the level of the comparator 23a, and sets the thinning signal to the "1" level, as shown in FIG. 7 (8), even during the period in which the positive voltage is applied from the commercial power source 21, so that the application of the voltage for turning off the switching circuit 27 is temporarily stopped, and as indicated by the period VII in FIG. 7 (A), the potential at the optical modulation element 29 is maintained.

After the optical modulation element 29 has been driven with a positive voltage for 3.5 cycles of the voltage of commercial power source 21, when the voltage of the commercial power source 21 falls below the zero crossing point to a negative voltage, the timing generation circuit 24 controls the on operation of the switching circuit 28, so that the same drive as described above with a negative voltage is performed for 3.5 cycles.

As described above, in the second operation example, in order to execute driving with one polarity in the first to third cycles, driving with the other polarity is canceled through thinning-out processing. Thus, by driving the modulation device 29 as a capacitive load with one polarity to hold the potential, the power consumption is suppressed. At the same time, the difference between the terminal side voltage TV and the distal end side voltage EV is reduced as much as possible to minimize surface unevenness in the transparent state.

In addition, in the half cycle after the third cycle, driving with one polarity itself is also canceled through thinning-out processing, so that the transparent state is maintained only by maintaining the potential of the optical modulation element 29. Therefore, it is possible to minimize surface unevenness in the transparent state while further reducing power consumption.

In the second operation example, as the actual drive frequency of the optical modulation element 29 is ⅐, the drive frequency for AC driving the optical modulation element 29 is significantly reduced by the thinning process. Depending on the desired transparency tone driven at that time, a flicker may be easily recognized.

In particular, flickering at the distal end side is likely to be visible since the time when the polarity is opaque is longer in the distal end side than in the terminal end side, as the potential drops at the moment when the polarity is reversed. Therefore, it is desirable to appropriately select the number of cycles for performing the thinning process in consideration of the transparency of the tone being driven at that time.

In the embodiment described above, a MOSFET is used as a switching element of the switching circuit, and the rectifying action of a parasitic diode of the MOSFET is used as an example. However, the present invention is not limited to this embodiment. For example, a bipolar transistor, an IGBT, a SiCFET, or a GaNFET can also be used as a configuration that can exhibit the same function.

As a rectifying element associated with the switching element, for example, a PN junction diode, a Schottky diode, a fast recovery diode, a SiC diode, a GaN diode, a MOSFET diode or the like may be used.

In the embodiment described above, the polymer dispersed-type liquid crystal in the normal mode is used, which is in the opaque diffusion state when no voltage is applied, and increases the transparency as needed when the voltage is applied. However, the present invention can be similarly applied to a polymer dispersed-type liquid crystal in the reverse mode, in which the characteristics are reverse to those in the normal mode.

In the embodiment described above, a liquid crystal device (optical modulation element) using a polymer dispersed liquid crystal is illustrated, but the invention is not limited thereto. The liquid crystal element may have a configuration in which a polarizing plate and an alignment film are provided at both ends of the liquid crystal layer, and a TN (Twisted Nematic) system, a VA (Vertical Alignment) system, an IPS (In-Plane Switching) system, or the like can be used. Further, as the optical modulation element, various types of electro-optical elements other than liquid crystal elements can be used, in which the refractive index changes in accordance with a voltage.

Further, the present invention is applicable not only to the light control glass using a glass substrate, but also to a device using a film made of a synthetic resin material having flexibility.

The present invention is not limited to the above-described embodiment, and can be modified in various manners in practice when implementing the invention without departing from the gist of the invention. Moreover, the embodiments can be suitably combined; in that case, the combined advantages are obtained. Furthermore, the above-described embodiment includes various inventions, and a variety of inventions can be derived by suitably combining structural elements disclosed in connection with the embodiment. For example, if the object of the invention is achieved and the advantages of the invention are attained even after some of the structural elements disclosed in connection with the embodiment are deleted, the structure made up of the resultant structural elements can be extracted as an invention.

The invention claimed is:

1. A liquid crystal optical modulation device which performs light control drive for a liquid crystal panel, the device comprising:
   a switching circuit that limits a power supply voltage, which is applied to the liquid crystal panel from a commercial AC source; and
   a control system that controls a voltage applied to the liquid crystal panel through the switching circuit in accordance with a phase of the power supply voltage of the commercial AC source,
   wherein the switching circuit perform opposite phase control by a switching element of the switching circuit.

2. The liquid crystal optical modulation device according to claim 1, wherein at any phase within a ¼ cycle of each of rising and falling from a zero crossing point of the commercial AC source, the control system turns on the switching element when an absolute value of the power supply voltage is equal to or lower than a limit voltage and applies the power supply voltage to the liquid crystal panel, and turns off the switching element when the absolute value of the power supply voltage exceeds the limit voltage.

3. The liquid crystal optical modulation device according to claim 1, wherein at any phase within a ¼ cycle of each of rising and falling from a zero crossing point of the commercial AC source, the control system turns on the switching element when an absolute value of the power supply voltage is equal to or lower than a limit voltage and applies the power supply voltage to the liquid crystal panel, and turns off the switching element to maintain the voltage applied to the liquid crystal panel at a timing when the absolute value of the power supply voltage reaches the limit voltage.

4. The liquid crystal optical modulation device according to claim 1, wherein the control system includes:
   a comparator that compares the power supply voltage applied to the liquid crystal panel with a reference voltage and turns the switching element on or off according to a comparison result of the comparator; and
   a variable DC power supply that variably adjusts the reference voltage to be applied to the comparator.

5. The liquid crystal optical modulation device according to claim 1, wherein at any phase within a ¼ cycle of one of rising and falling from a zero crossing point of the commercial AC source, the control system turns on the switching element when an absolute value of the power supply voltage is equal to or lower than a limit voltage and applies the power supply voltage to the liquid crystal panel, and turns off the switching element when the absolute value of the power supply voltage exceeds the limit voltage, thereafter stops an operation at any phase within a ¼ cycle of another of rising and falling from the zero crossing point of the commercial AC source for a period corresponding to one or more cycles, and continues voltage application in homopolarity.

6. The liquid crystal optical modulation device according to claim 1, wherein at any phase within a ¼ cycle of one of rising and falling from a zero crossing point of the commercial AC source, the control system turns on the switching element when an absolute value of the power supply voltage is equal to or lower than a limit voltage and applies the power supply voltage to the liquid crystal panel, and turns off the switching element when the absolute value of the power supply voltage exceeds the limit voltage, thereafter stops an operation at any phase within a ¼ cycle of another of rising and falling from the zero crossing point of the commercial AC source, and stops a subsequent operation at any phase within the ¼ cycle of the one of rising and falling from the zero crossing point of the commercial AC source.

7. The liquid crystal optical modulation device according to claim 1, wherein the switching circuit uses at least one of a bipolar transistor, a MOSFET, an IGBT, a SiCFET, and a GaNFET as a switching element.

8. The liquid crystal optical modulation device according to claim 1, wherein the switching circuit uses at least one of a PN junction diode, a Schottky diode, a fast recovery diode, a SiC diode, a GaN diode, and a MOSFET diode as a rectifying element.

9. A liquid crystal optical modulation method of performing light control drive for a liquid crystal panel, the method comprising:
   performing a voltage limiting to a power supply voltage applied to the liquid crystal panel from a commercial AC source; and
   controlling a voltage applied to the liquid crystal panel through the voltage limiting in accordance with a phase of the power supply voltage of the commercial AC source, wherein the voltage limiting includes performing opposite phase control by a switching element.

10. A liquid crystal optical modulation device which performs light control drive for a liquid crystal panel including a light control glass formed by two parallel plate glasses sealing a polymer dispersed-type liquid crystal between the plate glasses, the device comprising:
a switching circuit that limits a power supply voltage, which is applied to the liquid crystal panel from a commercial AC source; and
a control system that controls a voltage applied to the liquid crystal panel through the switching circuit by performing on/off control of the switching circuit in accordance with a phase of the power supply voltage of the commercial AC source,
wherein the control system is to control the switching circuit such that voltage application from the commercial power source to the liquid crystal panel is cut off, when an absolute value of the power supply voltage exceeds a limit voltage or when the absolute value of the power supply voltage reaches the limit voltage.

11. The liquid crystal optical modulation device according to claim 10, wherein,
the switching circuit comprises first and second switching elements,
the first switching element is turned on when the voltage from the commercial AC source rises above a zero crossing point,
the second switching element is turned on when the voltage from the commercial AC source falls below a zero crossing point,
the first and second switching elements are turned off, when an absolute value of the power supply voltage exceeds a limit voltage or when the absolute value of the power supply voltage reaches the limit voltage.

12. The liquid crystal optical modulation device according to claim 11, wherein at any phase within a ¼ cycle of each of rising and falling from a zero crossing point of the commercial AC source, the control system turns on one of the first or second switching elements when an absolute value of the power supply voltage is equal to or lower than a limit voltage and applies the power supply voltage to the liquid crystal panel, and turns off the one of the first or second switching elements when the absolute value of the power supply voltage exceeds the limit voltage.

13. The liquid crystal optical modulation device according to claim 11, wherein at any phase within a ¼ cycle of each of rising and falling from a zero crossing point of the commercial AC source, the control system turns on one of the first or second switching elements when an absolute value of the power supply voltage is equal to or lower than a limit voltage and applies the power supply voltage to the liquid crystal panel, and turns off the one of the first or second switching elements to maintain the voltage applied to the liquid crystal panel at a timing when the absolute value of the power supply voltage reaches the limit voltage.

14. The liquid crystal optical modulation device according to claim 11, wherein the control system includes:
a comparator that compares the power supply voltage applied to the liquid crystal panel with a reference voltage and turns one of the first or second switching elements on or off according to a comparison result of the comparator; and
a variable DC power supply that variably adjusts the reference voltage to be applied to the comparator.

15. The liquid crystal optical modulation device according to claim 11, wherein at any phase within a ¼ cycle of one of rising and falling from a zero crossing point of the commercial AC source, the control system turns on one of the first or second switching elements when an absolute value of the power supply voltage is equal to or lower than a limit voltage and applies the power supply voltage to the liquid crystal panel, and turns off the one of the first or second switching elements when the absolute value of the power supply voltage exceeds the limit voltage, thereafter stops an operation of other one of the first or second switching elements to be turned off at any phase within a ¼ cycle of another of rising and falling from the zero crossing point of the commercial AC source for a period corresponding to one or more cycles, and continues voltage application in homopolarity.

16. The liquid crystal optical modulation device according to claim 11, wherein at any phase within a ¼ cycle of one of rising and falling from a zero crossing point of the commercial AC source, the control system turns on one of the first or second switching elements when an absolute value of the power supply voltage is equal to or lower than a limit voltage and applies the power supply voltage to the liquid crystal panel, and turns off the one of the first or second switching elements when the absolute value of the power supply voltage exceeds the limit voltage, thereafter stops an operation of other one of the first or second switching elements to be turned off at any phase within a ¼ cycle of another of rising and falling from the zero crossing point of the commercial AC source, and stops a subsequent operation of the other one of the switching elements to be turned off at any phase within the ¼ cycle of the one of rising and falling from the zero crossing point of the commercial AC source.

17. The liquid crystal optical modulation device according to claim 10, wherein the switching circuit uses at least one of a bipolar transistor, a MOSFET, an IGBT, a SiCFET, and a GaNFET as a switching element.

18. The liquid crystal optical modulation device according to claim 10, wherein the switching circuit uses at least one of a PN junction diode, a Schottky diode, a fast recovery diode, a SiC diode, a GaN diode, and a MOSFET diode as a rectifying element.

19. A liquid crystal optical modulation method of performing light control drive for a liquid crystal panel including a light control glass formed by two parallel plate glasses sealing a polymer dispersed-type liquid crystal between the plate glasses, the method comprising:
performing, by a switching circuit, a voltage limiting to a power supply voltage applied to the liquid crystal panel from a commercial AC source; and
controlling, by a control system, a voltage applied to the liquid crystal panel through the voltage limiting in accordance with a phase of the power supply voltage of the commercial AC source system,
wherein controlling the voltage comprises controlling the switching circuit such that voltage application from the commercial power source to the liquid crystal panel is cut off, when an absolute value of the power supply voltage exceeds a limit voltage or when the absolute value of the power supply voltage reaches the limit voltage.

* * * * *